(12) United States Patent
Deng et al.

(10) Patent No.: US 9,609,662 B2
(45) Date of Patent: Mar. 28, 2017

(54) METHOD AND SYSTEM FOR DELAY SCHEDULING

(75) Inventors: Yun Deng, Shenzhen (CN); Qian Dai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 266 days.

(21) Appl. No.: 14/002,737

(22) PCT Filed: Feb. 20, 2012

(86) PCT No.: PCT/CN2012/071345
§ 371 (c)(1),
(2), (4) Date: Sep. 2, 2013

(87) PCT Pub. No.: WO2012/116605
PCT Pub. Date: Sep. 7, 2012

(65) Prior Publication Data
US 2013/0336301 A1    Dec. 19, 2013

(30) Foreign Application Priority Data
Mar. 2, 2011    (CN) .......................... 2011 1 0050345

(51) Int. Cl.
*H04W 72/12*    (2009.01)
*H04W 72/10*    (2009.01)
*H04W 48/06*    (2009.01)

(52) U.S. Cl.
CPC ........ *H04W 72/1289* (2013.01); *H04W 48/06* (2013.01)

(58) Field of Classification Search
CPC ......... H04W 72/1242; H04W 72/1278; H04W 72/1284; H04W 72/1289; H04W 48/06;
(Continued)

(56) References Cited

U.S. PATENT DOCUMENTS

| 6,622,251 B1 | 9/2003 | Lindskog et al. |
| 7,916,675 B2 * | 3/2011 | Dalsgaard ............... H04L 12/12 370/311 |

(Continued)

FOREIGN PATENT DOCUMENTS

| CN | 1354939 A | 6/2002 |
| CN | 101472272 A | 7/2009 |
| CN | 101500299 A | 8/2009 |

OTHER PUBLICATIONS

International Search Report in international application No. PCT/CN2012/071345, mailed on May 24, 2012. (3 pages).

(Continued)

*Primary Examiner* — Ahmed Elallam
(74) *Attorney, Agent, or Firm* — Oppedahl Patent Law Firm LLC (57) ABSTRACT

The present disclosure discloses a method for delay scheduling, comprising: sending, by a base station, delay scheduling information to a terminal for performing delay scheduling on the terminal; receiving, by the terminal, the delay scheduling information, and stopping monitoring a Physical Downlink Control Channel PDCCH and entering a delay scheduling state according to the received delay scheduling information; and restarting monitoring the PDCCH and terminating the delay scheduling state according to the delay scheduling information. The present disclosure also discloses a delay scheduling system, which enhances an overload processing ability of network. Meanwhile, a mass of radio resources required to access to the network may be saved, and thereby the radio resources can be saved effectively, the load at the network side is relieved.

17 Claims, 2 Drawing Sheets

---

A base station sends delay scheduling information to a terminal for performing delay scheduling on the terminal — 101 the terminal stops monitoring a PDCCH and enters a delay scheduling state according to the received delay scheduling information; and the terminal restarts monitoring the PDCCH and terminating the delay scheduling state according to the delay scheduling information — 102

(58) Field of Classification Search
CPC ............. H04W 48/02; H04W 72/1205; H04W 72/1226; H04W 74/006; H04W 74/008
See application file for complete search history.

(56) References Cited

U.S. PATENT DOCUMENTS

| | | | |
|---|---|---|---|
| 2009/0176502 A1* | 7/2009 | Kuo | 455/450 |
| 2009/0232054 A1 | 9/2009 | Wang | |
| 2009/0316593 A1* | 12/2009 | Wang et al. | 370/252 |
| 2010/0144299 A1* | 6/2010 | Ren | H04B 1/1615 455/226.1 |
| 2010/0232366 A1* | 9/2010 | Iwamura et al. | 370/329 |
| 2010/0287422 A1 | 11/2010 | Miyazaki | |
| 2011/0003555 A1* | 1/2011 | Guo | 455/67.11 |
| 2011/0059745 A1* | 3/2011 | Yi et al. | 455/452.2 |
| 2011/0237266 A1* | 9/2011 | Cai | 455/450 |
| 2012/0002635 A1* | 1/2012 | Chung et al. | 370/329 |
| 2012/0051226 A1* | 3/2012 | Cai | H04W 52/0216 370/241 |
| 2013/0265923 A1 | 10/2013 | Wang et al. | |
| 2013/0265924 A1* | 10/2013 | Kim | H04W 52/0235 370/311 |
| 2014/0274082 A1* | 9/2014 | Huang | H04W 28/20 455/450 |

OTHER PUBLICATIONS

English Translation of the Written Opinion of the International Search Authority in international application No. PCT/CN2012/071345, mailed on May 24, 2012. (7 pages).

Ericsson, Details of MAC DRX Control, 3GPP TSG-RAN WG2 Meeting#61, R2-080934, Feb. 11, 2008. (5 pages).

Supplementary European Search Report in European application No. 12752469.2, mailed on Jul. 16, 2014.

* cited by examiner

METHOD AND SYSTEM FOR DELAY SCHEDULING

TECHNICAL FIELD

The present disclosure relates to overload processing technologies in mobile communications, and in particular, to method and system for delay scheduling.

BACKGROUND

The Human-to-Human (H2H) communication is that persons communicate by operating devices. Current wireless communication technology is developed based on H2H technology. In a narrow sense, the definition of Machine-to-Machine (M2M) communication is communications between machines. While in a broad sense, the definition of M2M is the networked applications and services based on intelligent interactions between machine terminals. The M2M communication technology is based on intelligent machine terminals and uses multiple communication modes as access means, so as to provide users with informatization solutions to satisfy the informatization requirements of users in monitoring, command and dispatch, collection and measure of data.

The development of wireless technology is an important factor for the market development of M2M, which breaks through the time and space limit and the region barrier to liberate enterprises and public from cable constraint, so as to allow clients to control the cost more effectively, to reduce the installation charge and to use simply. Additionally, the increasing demand pushes forward the M2M to develop continuously. However, in contrast with the increasing information processing ability and network bandwidth, the measure for acquiring information falls far behind. The M2M technology satisfies this requirement very well. Through the M2M technology, people can monitor external environment, so as to realize automatic information acquisition in large area. Therefore, the industry application includes traffic monitoring, warning system, salvage, vending machine, electronic toll collection and so on, and the home application includes automatic meter reading, temperature control, and the personal application includes life detection, remote diagnostics and so on.

The object of M2M communication is machine-to-machine or human-to-machine. The data communication between machines is defined as Machine Type Communication (MTC) and in this case, human-machine interaction is slightly required. The machine participating in MTC is called as MTC device or MTC terminal, a MTC device is capable of communicating with other MTC devices or MTC servers through Public Land Mobile-communication Networks (PLMN).

After the introduction of the MTC application, some optimization can be made on the current communication system according to the characteristics of MTC to satisfy the requirements of the MTC application, without any impact on normal User Equipments (UE) in the current network. Some of the outstanding characteristics of the MTC application comprise: there are a large number of MTC devices, and the data amount for each transmission is small, large interval between transmissions and a part of MTC devices have relative fixed positions. According to statistics, the number of MTC devices installed within the scope of a community in a certain city will reach 3000, when those MTC devices initiate random access intensively, such as giving alarms when a fire or an earthquake happens, such a large number of MTC devices will produce a prodigious impact to the network. In general, multiple base stations will be connected to a same network element of the core network, such as a mobility management entity (MME). When a numerous of MTC devices in all base stations need to access to the network, for example, all MTC devices need to re-register to the network during a power recovery after an outage, the MME will bear a tremendous signaling impact and even lead to overload.

when a numerous of MTC devices intends to access to the network, a large amount of random access resources and dedicated resources will be occupied, wherein the dedicated resources include Physical Downlink Control Channel (PDCCH) resources, Physical Uplink Control Channel (PUCCH) resources, Physical Downlink Shared Channel (PDSCH) resources and the like, which can cause the occurrence of overload for random access resources and dedicated resources, and thus affecting service application of normal H2H devices. Thus, it is necessary for the base station to adjust the access control parameters dynamically based on its load conditions, and a part of terminals may be rejected or released, so as to control the load reasonably.

If a terminal has accessed the network and the service is on the fly, the base station will release radio resource control (RRC) connections of a part of terminals and radio resources to reduce the load of MME when an overload occurs at the network side. After that, if a released terminal needs to carry out a service again, it needs to rebuild an RRC connection, re-initiate a random access, re-execute an encryption procedure and re-establish a service bearer. These procedures will consume a lot of radio resources and occupy multiple air interface signalings, which will increase the processing load of the base station and the processing load of MME.

SUMMARY

Therefore, the present disclosure provides a delay scheduling method and system which can reduce the load at the network side. Meanwhile, a mass of radio resources required to access to the network after the terminal has been released can be saved.

The present disclosure is accomplished as following:

The present disclosure provides a method which comprises:

a base station sends delay scheduling information to a terminal for performing delay scheduling on the terminal;

the terminal receives the delay scheduling information, and stops monitoring a Physical Downlink Control Channel PDCCH and enters a delay scheduling state according to the received delay scheduling information; and restarts monitoring the PDCCH and terminating the delay scheduling state according to the delay scheduling information.

In the above solution, the step of sending, by a base station, delay scheduling information to a terminal for performing delay scheduling on the terminal may include: the base station sends the delay scheduling information to the terminal via a RRC signaling or a Medium Access Control (MAC) signaling or a PDCCH signaling.

In the above solution, after the terminal stops monitoring the PDCCH and enters the delay scheduling state, the method may further include: the terminal stops sending a scheduling request, or a Physical Uplink Control Channel (PUCCH) signaling, or data on a Physical Downlink Shared Channel (PUSCH), or a Sounding Reference Signal (SRS).

In the above solution, after the terminal stops monitoring the PDCCH and enters the delay scheduling state, the method may further include: the terminal saves communication context information, and/or data radio bearer information, and/or a radio network temporary identifier allocated by the base station, and/or current transmission state information, and/or current transmission state information of radio link control layer of the terminal.

In the above solution, after the terminal stops monitoring the PDCCH and enters the delay scheduling state, the method may further include: when a service request is required to be initiated, the terminal stops the delay scheduling state and initiating the service request when a priority of the service to be initiated is higher than a preset priority threshold.

In the above solution, the step of sending, by a base station, a delay scheduling information to a terminal for performing delay scheduling on the terminal may include: the base station sends the delay scheduling information to the terminal after the base station verifies that an established service is a delay tolerant service or a low priority service.

In the above solution, the delay scheduling information may include: a delay scheduling starting time for instructing the terminal to enter the delay scheduling state and a delay scheduling terminating time for instructing the terminal to terminate the delay scheduling state; or the delay scheduling information comprises: the delay scheduling starting time and a delay scheduling duration for instructing a duration within which the terminal maintains the delay scheduling state; or the delay scheduling information comprises: the delay scheduling terminating time or the delay scheduling duration.

The present disclosure further provides a system for delay scheduling, the system comprises a base station and a terminal, wherein the base station is configured to send delay scheduling information to the terminal for performing delay scheduling on the terminal;

the terminal is configured to receive the delay scheduling information, and stop monitoring a Physical Downlink Control Channel PDCCH and enter a delay scheduling state according to the received delay scheduling information, and restart monitoring the PDCCH and terminate the delay scheduling state according to the delay scheduling information.

In the above solution, the terminal is a Machine Type Communication MTC device and/or a Human-to-Human H2H device.

In the above solution, the terminal is further configured to, after entering the delay scheduling state, stop sending a scheduling request, or a Physical Uplink Control Channel PUCCH signaling, or data on a Physical Uplink Shared Channel PUSCH, or a Sounding Reference Signal SRS.

In the above solution, the terminal is further configured to, after the terminal enters the delay scheduling state, save communication context information, and/or data radio bearer information, and/or a radio network temporary identifier allocated by the base station, and/or current transmission state information of the terminal, and/or current transmission state information of radio link control layer of the terminal.

In the above solution, the terminal is further configured to, when a service request is required to be initiated, stop the delay scheduling state and initiate the service request when a priority of the service to be initiated is higher than a preset priority threshold.

In the above solution, the terminal is further configured to send the delay scheduling information to the terminal after the base station verifies that an established service is a delay tolerant service or a low priority service.

In the above solution, the base station is further configured to send the delay scheduling information to the terminal via a Radio Resource Control RRC signaling, or a Medium Access Control MAC signaling, or a PDCCH signaling.

In the delay scheduling method and system according to the present disclosure, when a network side is overloaded, a base station sends delay scheduling information to a terminal so as to perform delay scheduling on the terminal, and this may reduce the load at the network side and enhance an overload processing ability of the network. After the delay scheduling, the terminal may restart monitoring the PDCCH and continue services again without accessing to the network again, so that a mass of radio resources required to access to the network may be saved, and thereby the radio resources can be saved effectively, the load at the network side is relieved.

DETAILED DESCRIPTION

The basic idea of the present disclosure is that, a overloaded network side performs delay scheduling for its terminals such that the terminals pauses their launched services during the delay scheduling to decrease the load at network side; the terminal re-launches the service after a preset delay scheduling time without request of re-accessing to the network, and therefore avoiding from consuming resources and increasing load at network side.

Figure 1:
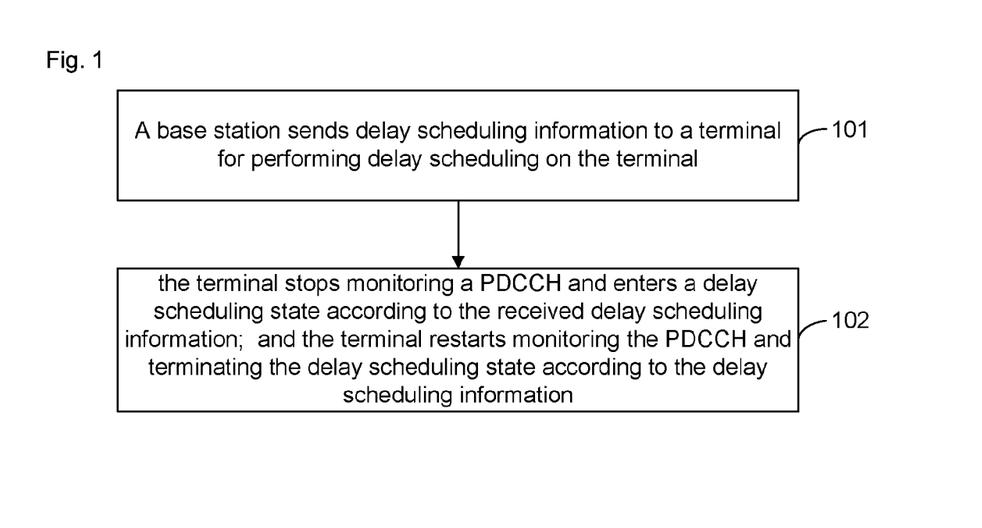
FIG. 1 is a flow diagram of the implementation of a delay scheduling method according to the present disclosure.

The method for delay scheduling according to the present disclosure, with reference to FIG. 1, substantially includes the following steps:

step 101: A base station sends a delay scheduling information to a terminal for performing delay scheduling on the terminal;

step 102: The terminal receives the delay scheduling information, and stops monitoring a PDCCH and enters a delay scheduling state according to the received delay scheduling information; and the terminal restarts monitoring the PDCCH and terminates the delay scheduling state according to the delay scheduling information.

The method for delay scheduling of the present disclosure can reduce the load at network side when the network side is overloaded, the network overload can include wireless access network overload and/or core network overload.

wherein the base station can send the delay scheduling information to the terminal via a RRC signaling, or a Medium Access Control (MAC) signaling, or a PDCCH signaling.

Here, after the terminal stops monitoring the PDCCH and enters the delay scheduling state, the terminal further stops sending a scheduling request, or a PUCCH signaling, or data on a PUSCH, or Sounding Reference Signal (SRS).

Herein, the terminal stopping sending the PUCCH signaling can include stopping sending the instruction information for assisting the base station in implementing the scheduling decision for the terminal. For example, the PUCCH signaling that has been stopped from sending may include Channel Quality Indicator (CQI), Pre-coding Matrix Indicator (PMI) or Rank Indicator (RI).

Here, after the terminal stops monitoring the PDCCH and enters the delay scheduling state, the terminal further saves communication context information, and/or data radio bearer information, and/or a wireless network temporary identifier allocated by the base station, and/or current transmission state information of the terminal, and/or current transmission state information in the radio link control layer of the terminal.

Here, after the terminal stops monitoring the PDCCH and enters the delay scheduling state, if a new service request is required to be initiated, the terminal stops the delay scheduling state and initiate the new service request when a priority of the new service to be initiated is higher than a preset priority threshold.

The step of sending, by the terminal, the delay scheduling information to the terminal for performing delay scheduling on the terminal specially comprises: after the base station verifies that an established service of the terminal is a delay tolerant service or a lower priority service, the base station sends the delay scheduling information to the terminal.

Here, the delay scheduling information includes: a delay scheduling starting time for instructing the terminal to enter the delay scheduling state and a delay scheduling terminating time for instructing the terminal to terminate the delay scheduling state; or the delay scheduling information includes: the delay scheduling starting time and a delay scheduling duration for instructing a duration within which the terminal maintains the delay scheduling state; or the delay scheduling information includes: the delay scheduling terminating time or the delay scheduling duration.

Correspondingly, the present disclosure also provides a system for delay scheduling, the system includes: a base station and a terminal; wherein the base station is configured to send delay scheduling information to the terminal for performing delay scheduling on the terminal; the terminal is configured to receive the delay scheduling information sent by the base station; the terminal stops monitoring the PDCCH and enters a delay scheduling state according to the received delay scheduling information; and the terminal restarts monitoring the PDCCH and terminates the delay scheduling state according to the delay scheduling information.

Specifically, the terminal may be a MTC device and/or a H2H device.

Here, the terminal is further configured to, after entering the delay scheduling state, stop sending a scheduling request, or a PUCCH signaling, or data on a PUSCH, or a Sounding Reference Signal SRS.

Here, the terminal is further configured to, after the terminal enters the delay scheduling state, save communication context information, and/or data radio bearer information, and/or a radio network temporary identifier allocated by the base station, and/or current transmission state information of the terminal, and/or current transmission state information of radio link control layer of the terminal.

Here, the terminal may further be configured to, when a service request is required to be initiated, stop the delay scheduling state and initiate the new service request when a priority of the new service to be initiated is higher than a preset priority threshold.

Here, the terminal may further be configured to send the delay scheduling information to the terminal after the base station verifies that an established service is a delay tolerant service or a low priority service. The base station may further be configured to send the delay scheduling information to the terminal via a RRC signaling, or a MAC signaling, or a PDCCH signaling.

The First Embodiment

The embodiment takes a MTC device as an example. In a Long-Term Evolution (LTE) system, the MTC device accesses a network via a base station 1 and it is in a connected state. At this time, the MTC device has finished a random access procedure and an encryption procedure and has built the data radio bearer (DRB) used for data transmission. The MTC is carrying out services, such as sending data to a MTC server. Since there are a large number of MTC devices and H2H devices that access to the network, it causes an overload at the network side, such as, an overload of a network element of the core network, for example MME, or an overload of the base station 1.

Figure 2:
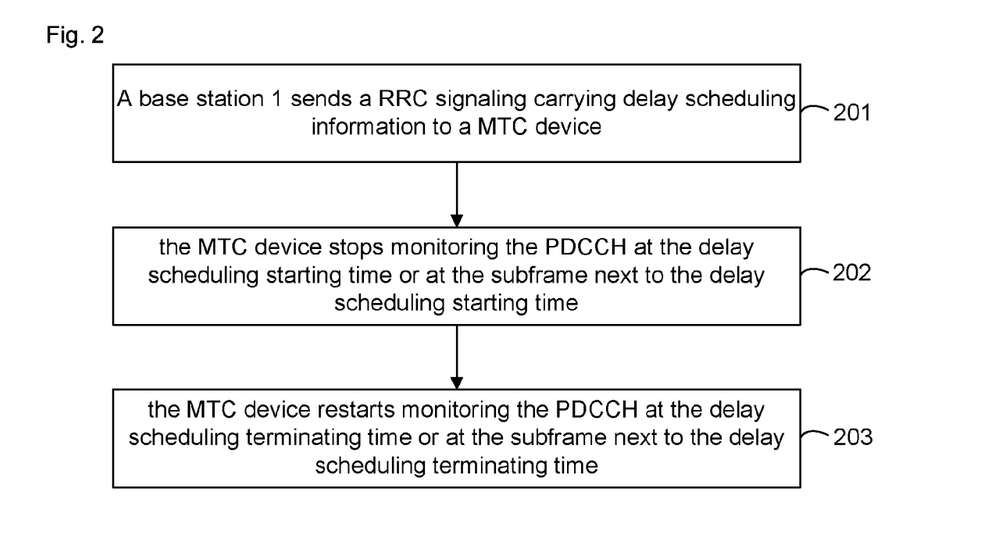
FIG. 2 is a flow diagram of the implementation of a delay scheduling method according to a first embodiment of the present disclosure.

At this moment, it is necessary for the base station 1 to reduce the current load to ensure the current network to be in a normal state. In the embodiment, the base station 1 can adopt the delay scheduling method as following to reduce the load at network side, the specific process, as shown in FIG. 2, is as following:

Step 201: the base station 1 sends a RRC signaling carrying delay scheduling information to the MTC device.

Here, the delay scheduling information may include a delay scheduling starting time and a delay scheduling terminating time.

In LTE, the System Frame Number (SFN) and the subframe number are used to represent time information, wherein SFN repeats from 0 to 1023, each SFN represents 10 ms; each SFN is consist of 10 subframes, and each subframe represents 1 ms and the subframe number ranges from 0 to 9. Here, in the delay scheduling information sent from the base station to the MTC device, the delay scheduling starting time specifically includes a System Frame Number and a subframe number for starting the delay scheduling, the delay scheduling terminating time specifically includes a System Frame Number and a subframe number for terminating the delay scheduling.

For example, the delay scheduling starting time can be SFN=100, subframe number=0, the delay scheduling terminating time can be SFN=220, subframe number=3.

Step 202: the MTC device receives the RRC signaling sent from the base station 1 and extracts the delay scheduling information from the RRC signaling; and the MTC device stops monitoring the PDCCH at the delay scheduling starting time in the delay scheduling information or at the subframe next to the delay scheduling starting time. After stopping monitoring the PDCCH, the MTC device then terminates its current service.

Here, it can be determined in advance by a protocol either to stop monitoring the PDCCH at the delay scheduling starting time in the delay scheduling information or to stop monitoring the PDCCH at the subframe next to the delay scheduling starting time.

For example, if the delay scheduling starting time is SFN=100, subframe number=0, the MTC device will stop monitoring the PDCCH when SFN=100, subframe number=0, or when MTC device is SFN=100, subframe number=1.

Here, during the period that the MTC device stops monitoring the PDCCH, the MTC device stops sending a scheduling request, or a PUCCH signaling, or data on a PUSCH, or a Sounding Reference Signal SRS, so as to avoid from occupying radio resources of the air interface, which increases the load at network side.

Here, during the period that the MTC device stops monitoring the PDCCH, the MTC device can save communication context information, and/or data radio bearer information, and/or radio network temporary identifier (RNTI) allocated by the base station, and/or other dedicated radio resource configuration information (RadioResourceConfigDedicated). Thus, when the MTC device will monitor the PDCCH again, the MTC device can continue to use the previous configuration without consuming air interface signaling to configure the above parameters. The communication context information can include an encryption algorithm, an integrity protection algorithm and the like adopted by the MTC device.

During the period that the MTC device stops monitoring the PDCCH, the MTC device may save its current transmission state information, and/or transmission state information of the Radio Link Control RLC layer, wherein the transmission state information may include the transmitted Packet Data Convergence Protocol (PDCP) serial number and the PDCP serial number which has not been transmitted yet, the transmission state information of the RLC layer may include the transmitted RLC serial number and the RLC serial number which has not been transmitted yet. Thus, after the MTC device restarts monitoring the PDCCH, the MTC device may continue to send data to the base station 1 and can ensure the nonoccurrence of data losing.

Step 203: the MTC device restarts monitoring the PDCCH at the delay scheduling terminating time in the delay scheduling information or at the subframe next to the delay scheduling terminating time, so that the MTC device keeps in communication with the network side and continues the services.

Here, it can be determined in advance by a protocol either to restart monitoring the PDCCH at the delay scheduling terminating time in the delay scheduling information or to restart monitoring the PDCCH at the subframe next to the delay scheduling terminating time.

For example, if the delay scheduling terminating time is SFN=220, subframe number=3, then the MTC terminal restarts monitor the PDCCH at SFN=220, subframe number=3, or at SFN=220, subframe number=4.

Here, after the MTC device restarts monitoring the PDCCH, the MTC device allows to send a scheduling request and to send control information on a PUCCH and data on a PUSCH.

In the embodiment, by using the delay scheduling method, the MTC device does not transmit its non access layer signaling and data to the core network for a period of time, so as to reduce the load of the air interface and the load at the core network side effectively. At the same time, when the MTC device send data to the network again, it does not need to rebuild a RRC connection, to re-initiate an encryption procedure, to re-establish data radio bearer used for data transmission, so as to reduce the consumed resource of the air interface.

It should be noted that this embodiment applies to the H2H device as well.

The Second Embodiment

This embodiment takes a H2H device as an example. In a Long-Term Evolution system, the H2H device accesses to a network via a base station 2 and it is in a connected state. At this time, the H2H equipment has finished a random access procedure and an encryption procedure and has built the data radio bearer used for data transmission. The H2H device is carrying out services, including sending data and receiving data.

Figure 3:
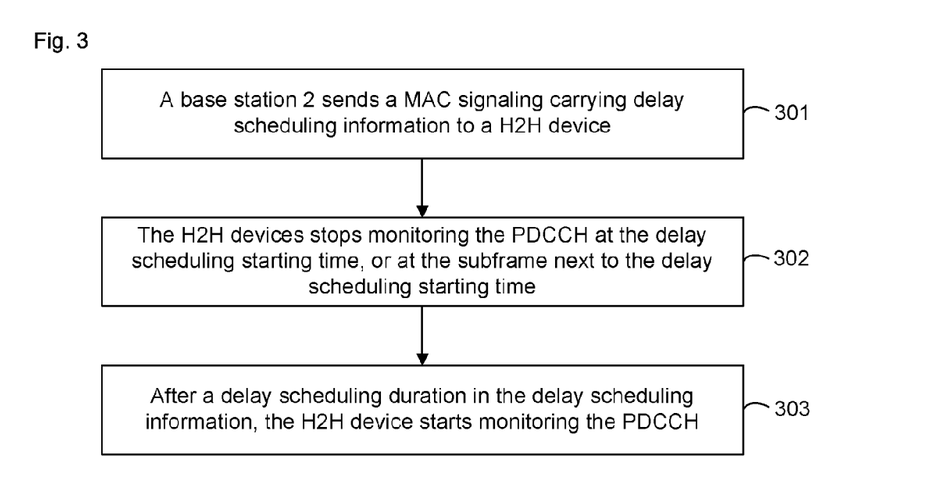
FIG. 3 is a flow diagram of the implementation of a delay scheduling method according to a second embodiment of the present disclosure.

Since there are a large number of MTC devices and H2H devices that access to the network, it causes an overload at the network side. At this moment, it is necessary for the base station 2 to reduce the load at the network side to ensure the network to be in a normal state. In the embodiment, the base station 2 can adopt the delay scheduling method as following to reduce the load at the network side, the specific process, as shown in FIG. 2, is as following:

Step 301: the base station 2 sends a MAC signaling carrying delay scheduling information to the H2H device.

Here, the delay scheduling information may include a delay scheduling starting time and a delay scheduling duration.

The information of the delay scheduling starting time specifically includes SFN and subframe number at the beginning of the delay scheduling. The delay scheduling duration can be a time span (e.g. 20 s) or the number of subframes (e.g. 5 subframes).

For example, in the delay scheduling information sent by the base station 2 to the H2H device, the delay scheduling starting time can be SFN=200, subframe number=0, the delay scheduling duration may be 20 s.

Step 302: the H2H device receives the MAC signaling sent from the base station 2 and extracts the delay scheduling information from the MAC signaling; and the H2H devices stops monitoring the PDCCH at the delay scheduling starting time in the delay scheduling information, or at the subframe next to the delay scheduling starting time. After the MTC device stops monitoring the PDCCH, the MTC device will terminate its current services.

For example, when the delay scheduling starting time is SFN=200, subframe number=5, the H2H device stops monitoring the PDCCH at SFN=200, subframe number=5, or at SFN=200, subframe number=6.

Here, during the period that the H2H device stops monitoring the PDCCH, the H2H device can save communication context information, so that when the H2H device communicates with the network side again, the H2H devices may use the previous configuration.

Here, during the period that the H2H device stops monitoring the PDCCH, the H2H device stops sending a scheduling request, or a PUCCH signaling, or data on a PUSCH, so as to avoid from occupying radio resource of the air interface, which increase the load at network side.

Step 303: after the delay scheduling duration in the delay scheduling information, the H2H device starts monitoring the PDCCH. Therefore, the H2H device may continue to keep in communication with the network side and continue the services.

For example, when the delay scheduling duration is 20 s, the H2H device restarts monitoring the PDCCH after stopping monitoring the PDCCH for the duration of 20 s.

In the embodiment, the step 301 further includes: the base station determines whether the service established by the H2H device is a delay tolerant service. If yes, the base station 2 will send a MAC signaling carrying the delay scheduling information to the H2H device so as to perform delay scheduling on the H2H device. If not, the base station 2 will not send the delay scheduling information to the H2H device, so as not to perform delay scheduling on the H2H device. Here, from a reason value that the H2H device initiates the RRC connection, the base station 2 may acknowledge whether the service built by the H2H device is a delay tolerant service.

In the embodiment, the delay scheduling method further includes: if it is required to initiate a new service request during the period that the H2H device stops monitoring the PDCCH, and the new service to be initiated has a priority higher than a preset threshold, then the terminal will stop the delay scheduling state, send a scheduling request or a service request to the base station 2 and restart monitoring the PDCCH, so as to build a new data radio bearer in time, which is used for data transmissions of services having a normal priority or a higher priority.

Here, the priority threshold can be preset in the H2H device and the base station 2, and can be sent by the base station 2 to the H2H device before or when the base station 2 sends the delay scheduling information to the H2H.

Here, when the H2H device terminates its delay scheduling state and sends a scheduling request to the base station 2, if H2H device does not have an available uplink (UL) grant for sending a new scheduling request or service request, the H2H device initiate a random access to the base station 2 to acquire the UL grant and then the H2H device sends the new scheduling request or service request to the base station 2 via the acquired UL grant.

It should be noted that the embodiment applies to the MTC device as well.

The Third Embodiment

Figure 4:
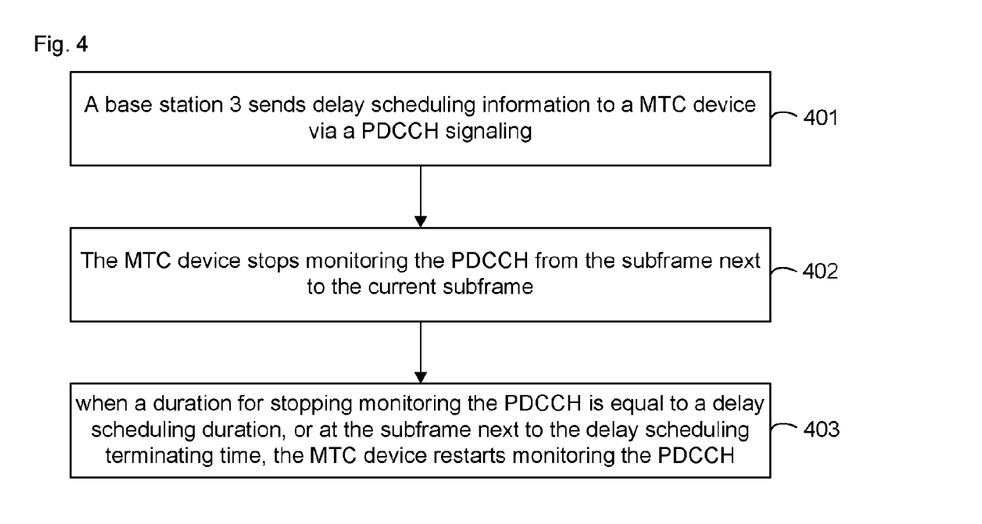
FIG. 4 is a flow diagram of the implementation of a delay scheduling method according to a third embodiment of the present disclosure.

In the embodiment, a base station in an overload state chooses a MTC device to perform delay scheduling, so as to reduce the current load. The specific procedure is provided as follows:

Step 401: the base station sends the delay scheduling information to the MTC device via a PDCCH signaling.

Here, the MTC device determines its own PDCCH signaling by a RNTI allocated by the base station.

The reception of the PDCCH signaling is confined in one subframe (i.e. the MTC device receives the PDCCH signaling belonging to the subframe in every millisecond). Therefore, in this embodiment, the delay scheduling information does not need to include a delay scheduling starting time, and it may only include a delay scheduling terminating time or a delay scheduling duration. Here, when the delay scheduling information does not include the delay scheduling starting time, the default delay scheduling starting time is the subframe during which the MTC device receives the PDCCH signaling.

Step 402: after the MTC device receives the PDCCH signaling in the current subframe, the MTC device extracts the delay scheduling information from the PDCCH signaling and stops monitoring the PDCCH from the subframe next to the current subframe.

During the period that the MTC device stops monitoring the PDCCH, the MTC device saves communication context information, so that when the MTC device communicates with the network side again, the MTC device may use the previous configuration. During the period that the MTC device stops monitoring the PDCCH, the MTC device stops sending a scheduling request, or a PUCCH signaling, or data on a PUSCH, or a Sounding Reference Signal SRS, so as to avoid from occupying radio resources of the air interface, which increases the load at network side.

Step 403: when a duration for stopping monitoring the PDCCH is equal to a delay scheduling duration, or at the subframe next to the delay scheduling terminating time, the MTC device restarts monitoring the PDCCH.

Here, step 403 is similar to the detailed implementations in step 203 of the first embodiment and step 303 of the second embodiment and will not be described here. However, it should be noted that this embodiment applies to the H2H device as well.

The above embodiments are only preferred embodiments of the present disclosure, and they are not intended to limit the scope of the present disclosure.

INDUSTRIAL APPLICABILITY

In the delay scheduling method and system according to the present disclosure, when a network side is overloaded, a base station sends delay scheduling information to a terminal so as to perform delay scheduling on the terminal, and this may reduce the load at the network side and enhance an overload processing ability of the network. After the delay scheduling, the terminal may restart monitoring the PDCCH and continue services again without accessing to the network again, so that a mass of radio resources required to access to the network may be saved, and thereby the radio resources can be saved effectively, the load at the network side is relieved.

The invention claimed is:

1. A method for delay scheduling, comprising:
   receiving, by a terminal, delay scheduling information from a base station for performing delay scheduling on the terminal;
   entering, by the terminal, a delay scheduling state according to the received delay scheduling information and stopping, monitoring a Physical Downlink Control Channel PDCCH; and
   restarting, by the terminal, monitoring the PDCCH and terminating the delay scheduling state according to the delay scheduling information;
   wherein the delay scheduling information comprises: a delay scheduling starting time for instructing the terminal to enter the delay scheduling state and a delay scheduling terminating time for instructing the terminal to terminate the delay scheduling state; or the delay scheduling information comprises: the delay scheduling starting time and a delay scheduling duration for instructing a duration within which the terminal maintains the delay scheduling state; or the delay scheduling information comprises: the delay scheduling terminating time; and
   wherein after the terminal enters the delay scheduling state and stops monitoring the PDCCH, the method further comprises:
   stopping, by the terminal, sending a scheduling request or data on a Physical Uplink Shared Channel PUSCH.

2. The method for delay scheduling according to claim 1, wherein the step of receiving, by a terminal, delay scheduling information from a base station for performing delay scheduling on the terminal comprises:
   receiving, by the terminal, the delay scheduling information from the base station via a Radio Resource Control RRC signaling or a Medium Access Control MAC signaling or a PDCCH signaling.

3. The method for delay scheduling according to claim 1, wherein after the terminal stops monitoring the PDCCH and enters the delay scheduling state, the method further comprises:
   saving, by the terminal, communication context information, and/or data radio bearer information, and/or a radio network temporary identifier allocated by the base station, and/or current transmission state information of the terminal, and/or current transmission state information of radio link control layer of the terminal.

4. The method for delay scheduling according to claim 1, wherein after the terminal stops monitoring the PDCCH and enters the delay scheduling state, the method further comprises:
when a service request is required to be initiated, stopping, by the terminal, the delay scheduling state and initiating the service request when a priority of the service to be initiated is higher than a preset priority threshold.

5. The method for delay scheduling according to claim 1, wherein the step of receiving, by the terminal, delay scheduling information from the base station for performing delay scheduling on the terminal comprises:
receiving, by the terminal, the delay scheduling information from the base station after the base station verifies that an established service is a delay tolerant service or a low priority service.

6. A terminal, comprising one or more processors configured to receive delay scheduling information from a base station for performing delay scheduling on the terminal, and enter a delay scheduling state according to the received delay scheduling information and stop monitoring a Physical Downlink Control Channel PDCCH, and restart monitoring the PDCCH and terminate the delay scheduling state according to the delay scheduling information;
wherein the delay scheduling information comprises: a delay scheduling starting time for instructing the terminal to enter the delay scheduling state and a delay scheduling terminating time for instructing the terminal to terminate the delay scheduling state; or the delay scheduling information comprises: the delay scheduling starting time and a delay scheduling duration for instructing a duration within which the terminal maintains the delay scheduling state; or the delay scheduling information comprises: the delay scheduling terminating time; and
wherein the one or more processors are further configured to, after entering the delay scheduling state, stop sending a scheduling request or data on a Physical Uplink Shared Channel PUSCH.

7. The terminal according to claim 6, wherein the terminal is a Machine Type Communication MTC device and/or a Human-to-Human H2H device.

8. The terminal according to claim 6, wherein the one or more processors are further configured to, after the terminal enters the delay scheduling state, save communication context information, and/or data radio bearer information, and/or a radio network temporary identifier allocated by the base station, and/or current transmission state information of the terminal, and/or current transmission state information of radio link control layer of the terminal.

9. The terminal according to claim 6, wherein the one or more processors are further configured to, when a service request is required to be initiated, stop the delay scheduling state and initiate the service request when a priority of the service to be initiated is higher than a preset priority threshold.

10. The terminal according to claim 6, wherein the one or more processors are further configured to receive the delay scheduling information from the base station after the base station verifies that an established service is a delay tolerant service or a low priority service.

11. The terminal according to claim 6, wherein the one or more processors are further configured to receive the delay scheduling information from the base station via a Radio Resource Control RRC signaling, or a Medium Access Control MAC signaling, or a PDCCH signaling.

12. A method for delay scheduling, comprising:
sending, by a base station, delay scheduling information to a terminal for performing delay scheduling on the terminal;
wherein the delay scheduling information is configured to enable the terminal to enter a delay scheduling state and stop monitoring a Physical Downlink Control Channel PDCCH, stop sending a scheduling request or data on a Physical Uplink Shared Channel PUSCH and restart monitoring the PDCCH and terminate the delay scheduling state; and
wherein the delay scheduling information comprises: a delay scheduling starting time for instructing the terminal to enter the delay scheduling state and a delay scheduling terminating time for instructing the terminal to terminate the delay scheduling state; or the delay scheduling information comprises: the delay scheduling starting time and a delay scheduling duration for instructing a duration within which the terminal maintains the delay scheduling state; or the delay scheduling information comprises: the delay scheduling terminating time.

13. The method for delay scheduling according to claim 12, wherein the step of sending, by a base station, delay scheduling information to a terminal for performing delay scheduling on the terminal comprises:
sending, by the base station, the delay scheduling information to the terminal via a Radio Resource Control RRC signaling or a Medium Access Control MAC signaling or a PDCCH signaling.

14. The method for delay scheduling according to claim 12, wherein the step of sending, by a base station, a delay scheduling information to a terminal for performing delay scheduling on the terminal comprises:
sending, by the base station, the delay scheduling information to the terminal after the base station verifies that an established service is a delay tolerant service or a low priority service.

15. A base station, comprising one or more processors configured to send delay scheduling information to the terminal for performing delay scheduling on the terminal;
wherein the delay scheduling information is configured to enable the terminal to enter a delay scheduling state according to the received delay scheduling information and stop monitoring a Physical Downlink Control Channel PDCCH, stop sending a scheduling request or data on a Physical Uplink Shared Channel PUSCH and restart monitoring the PDCCH and terminate the delay scheduling state according to the delay scheduling information; and
wherein the delay scheduling information comprises: a delay scheduling starting time for instructing the terminal to enter the delay scheduling state and a delay scheduling terminating time for instructing the terminal to terminate the delay scheduling state; or the delay scheduling information comprises: the delay scheduling starting time and a delay scheduling duration for instructing a duration within which the terminal maintains the delay scheduling state; or the delay scheduling information comprises: the delay scheduling terminating time.

16. The base station according to claim 15, wherein the one or more processors are further configured to send the delay scheduling information to the terminal after the base station verifies that an established service is a delay tolerant service or a low priority service.

17. The base station according to claim 15, wherein the one or more processors are further configured to send the delay scheduling information to) the terminal via a Radio Resource Control RRC signaling, or a Medium Access Control MAC signaling, or a PDCCH signaling.

* * * * *